Patented Aug. 20, 1946

2,406,275

UNITED STATES PATENT OFFICE 2,406,275

ELECTRICAL RESISTANCE ELEMENT

Axel Richard Wejnarth, Stockholm, Sweden

No Drawing. Application June 5, 1945, Serial No. 597,711. In Sweden April 7, 1942

4 Claims. (Cl. 201—76)

In my pending patent application No. 512,054 protection is claimed for electrical resistance elements durable at high temperature and proof against chemical action, consisting of a sintered mass, containing as main component silicon carbide and moreover, in smaller quantity, at least one compound, belonging to the group of chromium carbide, chromium nitride, chromium silicide and chromium boride, and as further component one or more carbides, nitrides, silicides or borides of one or some of the metals Be, Mo, W, Ti and V. The sintered mass according to the application may also contain one or more nitrides, silicides or borides of one or some of the metals Mn, Fe, Ni and Co.

It has now been found that electrical elements can be manufactured having the characteristic properties of the invention applied for, by manufacturing beyond the scope of the earlier patent application the elements from a sintered mass containing as main component silicon carbide and moreover, in smaller quantity, a carbide, a nitride, silicide or boride of Al or Zr or several different such compounds. In the present case, as according to the earlier patent application, the mass preferably contains a carbide, nitride, silicide or boride of chromium, and the mass can also contain any other compound mentioned in the application or a combination of several such compounds.

The statements in the earlier application regarding the process of manufacturing the electrodes intended in said application also apply to the manufacture of such electrodes of partially other composition as intended in the present application.

Having now described my invention, what I claim as new and desire to secure by Letters Patent is:

1. Electrical resistance element durable at high temperature and proof against chemical action, consisting of a sintered mass, containing as main component silicon carbide and moreover, in smaller quantity, at least one compound belonging to the group of aluminium carbide, aluminium nitride, aluminium silicide and aluminium boride.

2. Electrical resistance element durable at high temperature and proof against chemical action, consisting of a sintered mass, containing as main component silicon carbide and moreover, in smaller quantity, at least one compound belonging to the group of zirconium carbide, zirconium nitride, zirconium silicide, and zirconium boride.

3. Electrical resistance element durable at high temperature and proof against chemical action, consisting of a sintered mass, containing as main component silicon carbide and moreover, in smaller quantity, at least one compound belonging to the group of chromium carbide, chromium nitride, chromium silicide and chromium boride, and at least one compound, belonging to the group of aluminium carbide, aluminium nitride, aluminium silicide and aluminium boride.

4. Electrical resistance element durable at high temperature and proof against chemical action, consisting of a sintered mass, containing as main component silicon carbide and moreover, in smaller quantity, at least one compound belonging to the group of chromium carbide, chromium nitride, chromium silicide and chromium boride, and at least one compound, belonging to the group of zirconium carbide, zirconium nitride, zirconium silicide and zirconium boride.

AXEL RICHARD WEJNARTH.